United States Patent [19]

Lafuze

[11] 4,308,465
[45] Dec. 29, 1981

[54] FREQUENCY CONTROL FOR PARALLELED AC SYSTEMS

[75] Inventor: David L. Lafuze, Endicott, N.Y.

[73] Assignee: General Electric Company, Binghamton, N.Y.

[21] Appl. No.: 42,723

[22] Filed: May 25, 1979

[51] Int. Cl.³ .............................................. H02J 3/42
[52] U.S. Cl. ..................................... 307/87; 307/153; 318/66; 322/32
[58] Field of Search ................... 307/87, 73, 86–3500, 307/85–3500, 3, 129, 153, 58, 57; 328/133, 134; 318/66

[56] References Cited

PUBLICATIONS

Parallel Operation of Aircraft Alternators Using Electronic Frequency Changes, Bowles & Nims, AIEE Technical Paper 47-5, Oct. 1946, pp. 1–19.

Primary Examiner—L. T. Hix
Assistant Examiner—Stafford D. Schreyer
Attorney, Agent, or Firm—Arthur E. Bahr; I. David Blumenfeld; Irving M. Freedman

[57] ABSTRACT

A frequency control utilizing a reference oscillator and a signal controlled oscillator is disclosed. The frequency control maintains the frequency of an output signal at the same frequency as the reference oscillator if there is no signal present at a frequency control input. A signal at the frequency control input causes the frequency of the output signal to be varied accordingly. The frequency control contains a feedback loop which compares the output of the signal controlled oscillator with the fixed frequency of the output of the reference frequency oscillator. The frequency control of the present invention has particular applicability as a frequency control for parallel-connected AC systems.

9 Claims, 7 Drawing Figures

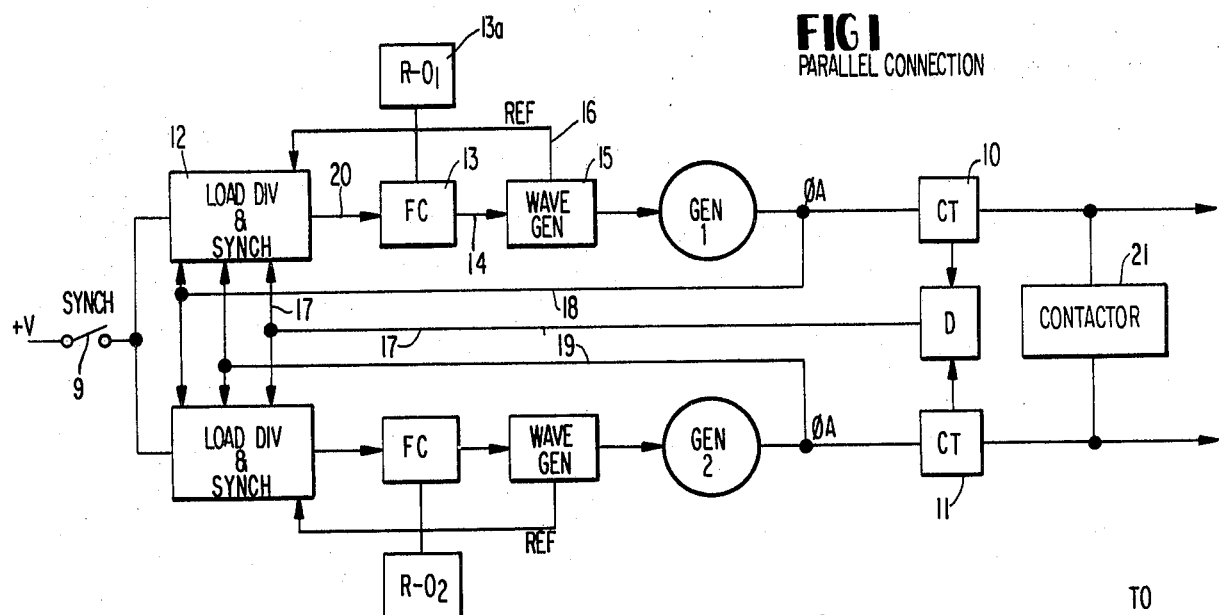
FIG 1
PARALLEL CONNECTION
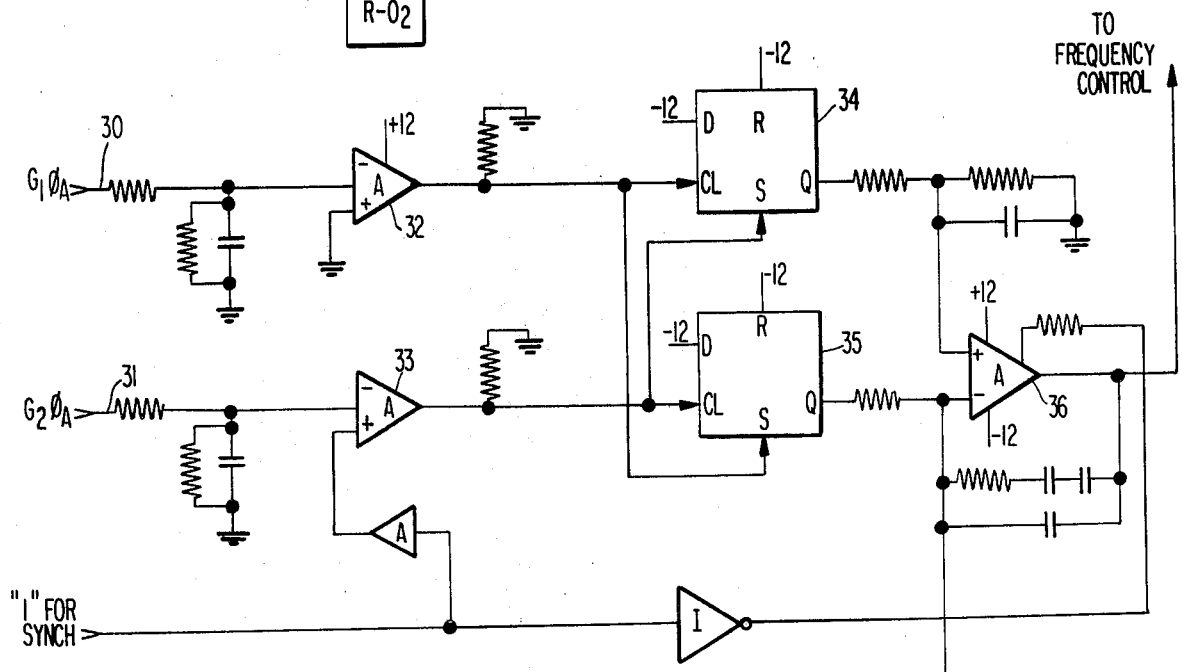
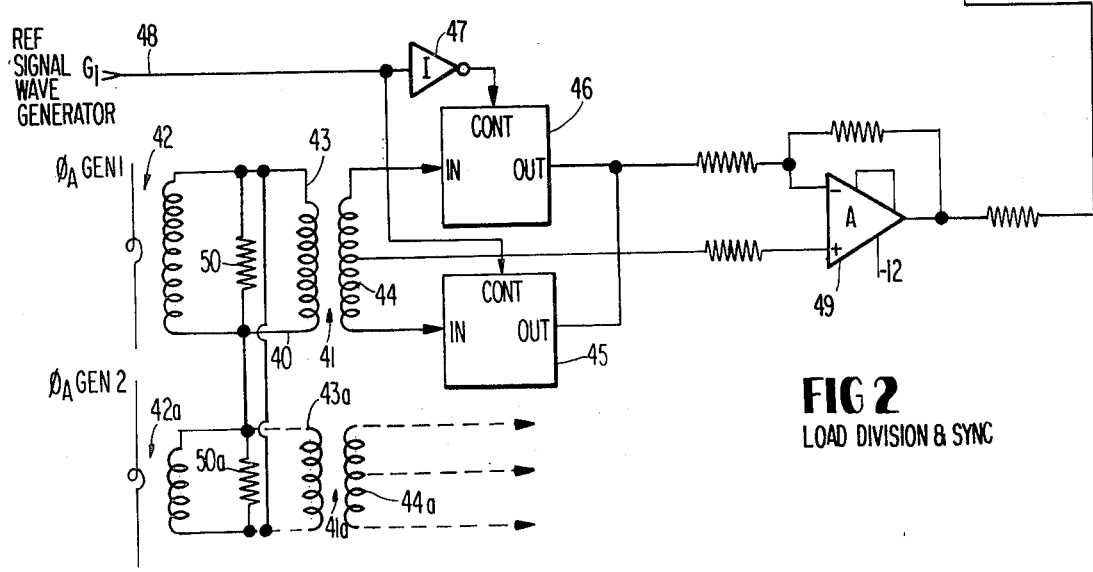
FIG 2
LOAD DIVISION & SYNC

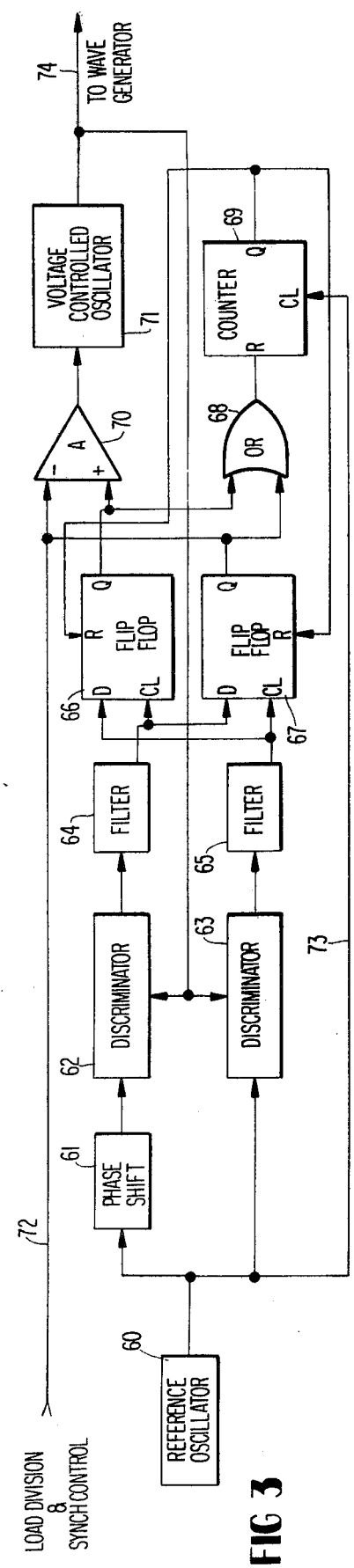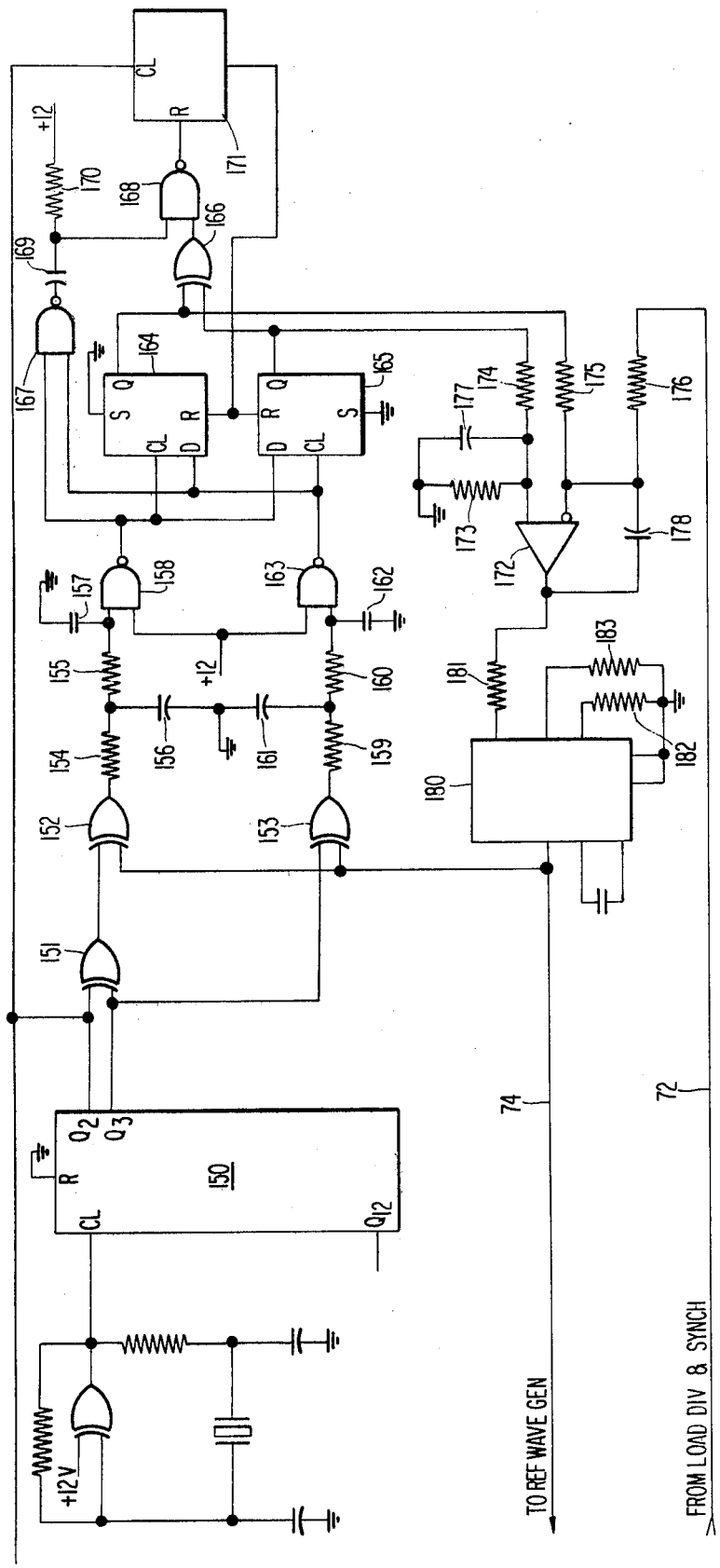

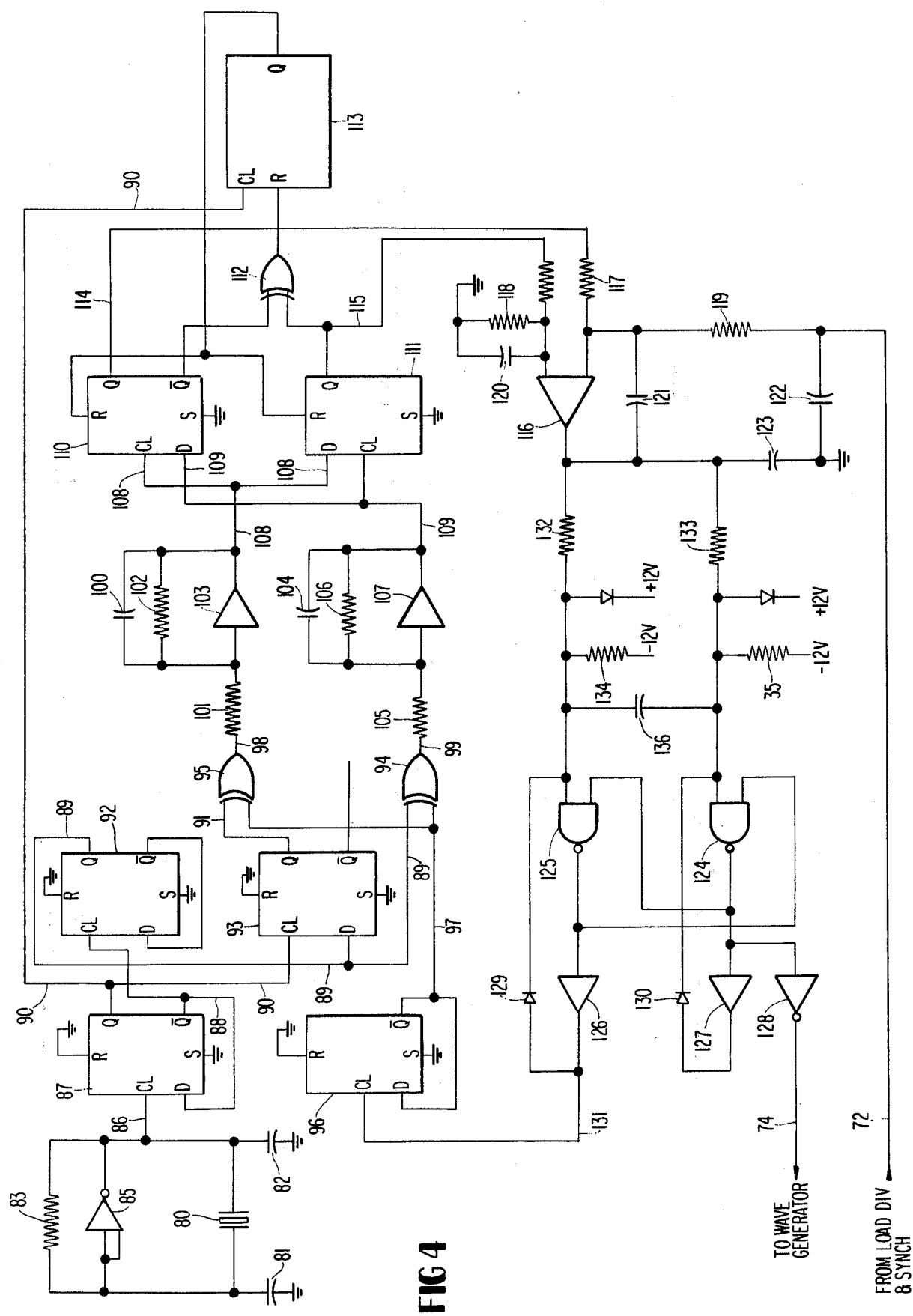

4,308,465

FREQUENCY CONTROL FOR PARALLELED AC SYSTEMS

The Government has rights in this invention pursuant to Contract No. F33615-74-C-2037 awarded by the Department of the Air Force.

BACKGROUND OF THE INVENTION

1. Field of the Invention

The present invention relates generally to frequency control circuits and methods and, more particularly, to frequency control of alternating current systems having individual reference oscillators. The present invention is applicable for matching the frequencies of parallel connected alternating current generators, and for adjusting the frequency of an AC motor in accordance with a frequency control signal.

The present invention has particular application in the field of variable speed constant frequency generator systems used in any aircraft environment. The present invention allows the generator systems to be connected in parallel so as to generate output signals having a frequency which is the average of all the individual frequencies of the generator systems. The present invention may also be used to control the prime mover speed in conventional generating systems so as to adjust frequency of the output of each machine when the outputs are connected in parallel.

2. Description of the Prior Art

The phase lock loop is a commonly used method of frequency control. In such phase lock loop systems, a master oscillator sets the system frequency, and all individual machines are then phase shifted with respect to this master oscillator in order to share the load. In this conventional method, the system maintains the master frequency. Such phase lock loop master oscillator systems work well during normal operation of parallel generator systems.

A major disadvantage of phase lock loop master oscillator systems is that if for any reason the master oscillator malfunctions, the entire system frequency will be lost. If this malfunction should occur in generator systems generating in parallel, such as a variable speed constant frequency (VSCF) system, there must be some backup means for providing a new master oscillator signal. When the master oscillator fails, however, logic circuitry must be provided to decide which of the oscillators of the other parallel systems is to become the new master oscillator for controlling the frequency of the entire parallel connected system.

BRIEF DESCRIPTION OF THE DRAWINGS

FIG. 1 illustrates in block diagram form two generator systems of the VSCF type connected in parallel in accordance with the present invention.

FIG. 2 shows an embodiment of the circuitry of the load division and synchronization circuit 12 of FIG. 1 which generates a control signal proportional to the circulating current present in the parallel connected systems.

FIG. 3 presents a block diagram of a frequency control having a reference oscillator and signal controlled oscillator.

FIG. 4 illustrates an embodiment of the frequency control circuit of FIG. 3.

FIG. 5 shows another embodiment of the frequency control circuit of FIG. 3 and includes an additional counter start pulse circuit.

SUMMARY OF THE INVENTION

Figure 6A:
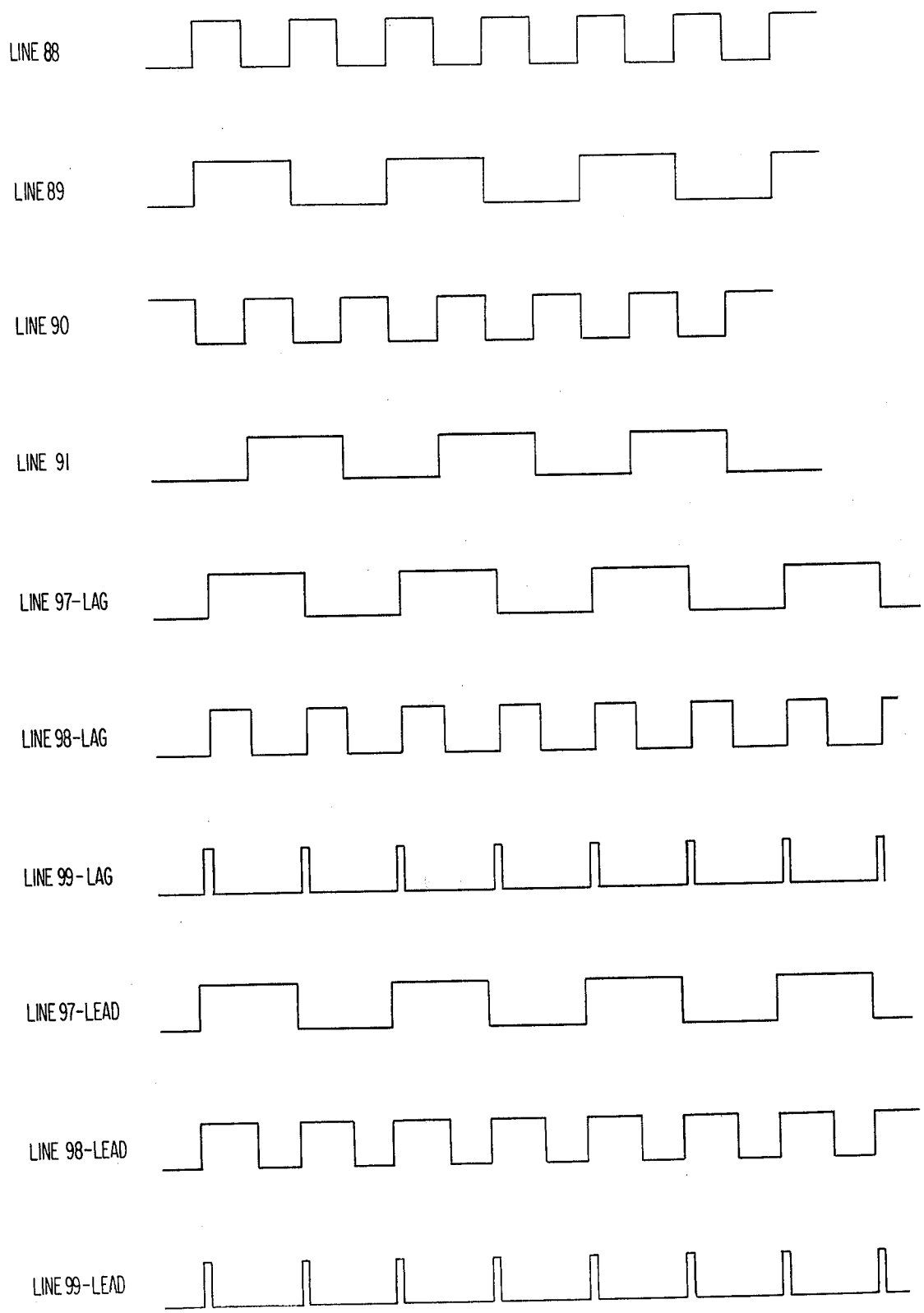
FIGS. 6A and 6B plot the wave forms which occur at the various stages of the circuit shown in FIG. 4, with the vertical axis of each plot representing amplitude and with the horizontal axis of each plot representing time.

In order to control the frequency of each parallel AC system in accordance with the average of all individual systems, the frequency control of each system in accordance with the present invention is provided with a signal control oscillator in addition to its reference oscillator. When not in parallel, the signal controlled oscillator is forced to the same frequency as the reference oscillator. The output of the signal controlled oscillator is used to control the frequency of the AC system or generator.

When two or more systems are paralleled or synchronized, a control signal is provided to the signal controlled oscillator. A control loop is provided in accordance with the present invention to adjust the frequency of the signal controlled oscillator up or down in accordance with whether the signal controlled oscillator output is faster than or slower than the reference oscillator output.

The frequency control of the present invention can determine whether the signal controlled oscillator output is faster or slower than the reference oscillator output. The absolute frequency difference between these two signals is determined by means of a discriminator.

The frequency control of the present invention averages all of the natural frequencies of the individual systems. Since none of the oscillators of the paralleled systems acts as a master oscillator, there is no need for the present invention to select a new master oscillator if one of these oscillators should fail. The parallel connected systems in accordance with the present invention will automatically average the frequencies of the remaining systems.

The present invention may also be used to adjust the frequency of motors. A reference oscillator maintains the nominal speed, and speed adjustment is accomplished using a second control signal applied to the frequency control loop.

The actual determination of whether the reference oscillator or the voltage controlled oscillator is faster or slower is determined in the preferred embodiments by phase shifting the output of the reference oscillator. The reference oscillator output and the phase shifted reference oscillator output are each discriminated with respect to the output of the signal controlled oscillator. Determination of which of these signals is leading determines which oscillator has a higher frequency.

DETAILED DESCRIPTION OF THE INVENTION

In FIG. 1, there are shown two generators connected in parallel which utilize frequency controls in accordance with the present invention. In the system shown, the circulating currents between phase A of generator 1 and phase A of generator 2 are detected. These circulating currents along with the reference oscillator associated with each generator are then used to control the frequency of each generator. More specifically, with respect to generator 1, there is shown a current transformer 10 connected to the phase A output, and a similar current transformer 11 connected to the phase A output of generator 2. By means of a transformer control loop 17, the transformers 10 and 11 sense the circulating current, and apply a voltage proportional to this circulating current to the load division and sync circuit 12.

The load division and sync circuit 12 generates a control signal, e.g., a voltage, which is proportional to a phasor portion of the circulating current, and this control signal is applied via a line 20 to a frequency control 13. For purposes of explanation, the control signal on line 20 is referred to as a control voltage signal, but this control signal could also be a control current signal. The frequency control 13 has associated with it reference oscillator 1, which is represented by circuit block 13a. The frequency control 13 adjusts the controlled frequency output on a line 14 in accordance with the reference oscillator 13a and the control voltage on line 20. A wave generator 15, such as that which is used on a variable speed constant frequency generator of the type shown in U.S. Pat. No. 3,873,928, entitled "Reference Wave Generator Using Logic Circuitry for Providing Substantially Sinusoidal Output," to David L. Lafuze, and assigned to the General Electric Company, receives on line 14 the controlled frequency signal from frequency control 13.

In the case of a VSCF system, such as that shown in U.S. Pat. No. 3,902,073, entitled "Starter Generator Electrical System Utilizing Phase Controlled Rectifiers to Drive a Dynamo-Electric Machine as a Brushless DC Motor in the Starter Mode and to Provide Frequency Conversion for a Constant Frequency Output in the Generating Mode," to David L. Lafuze, and assigned to the General Electric Company, it is known that the impedance of the generator is at approximately 45° lagging or in the inductive direction. In the instance of a VSCF generator, the wave generator, such as wave generator 15, will produce a substantially 45° leading signal along with many other signals necessary for generator control and operation. This 45° leading signal is the reference signal on a line 16 which is fed back to the load division and sync circuit 12. This reference signal enables the load division and sync circuit 12 to produce the control voltage signal on line 20 by selecting a phasor portion of the circulating current, the difference signal from the transformer control loop 17.

Also shown in FIG. 1 are lines 18 and 19, which feed back to the load division and sync circuit 12 the terminal voltages present at generator 1 phase A and generator 2 phase A, respectively. These terminal voltages are used in the initial synchronization of the two generators. Synchronization of the generators is initiated by a control switch 9, the closing of which activates a phase lock loop system within the load division and sync circuit 12 and a phase lock loop system within its counterpart for generator 2 for the purpose of bringing the generators into approximate phase alignment. This generator synchronization is necessary to prevent high transient currents which would otherwise occur when the contactor 21 is closed.

An identical control system in accordance with the present invention to that used for phase A of generator 1 is shown in FIG. 1 for phase A of generator 2. In structure, the two control systems are identical and, consequently, the system for phase A of generator 2 is not discussed in detail. In terms of operation, the circulating current signal derived by current transformers 10 and 11 is of opposite polarity for the two control systems. Thus, the control system for phase A of generator 2 operates inversely to the operation of the control system for phase A of generator 1. That is to say, if the control system for phase A of generator 1 causes generator 1 to speed up, the control system for phase A of generator 2 causes generator 2 to slow down correspondingly, and vice versa. It should also be understood that any number of generator systems can be controlled by control systems of the present invention in an analogous fashion so as to operate all of these systems in parallel.

In FIG. 2, there is shown in detail a load division and sync circuit 12 which may be used for initial synchronization, and the production of the control frequency signal for the frequency control 13. As stated above, there is a separate load division and sync circuit 12 associated with each of the generators of the AC systems connected in parallel. In operation, the generators are synchronized, and once the synchronization is complete, the contactors 21 are closed, causing the generators of the systems to be operating in parallel. Upon the closing of the contactor 21 (FIG. 1), the terminal voltages on feedback lines 18 and 19 are identical because generators 1 and 2 are in parallel. Thus, the signals at inputs 30 and 31 of the load division and sync circuit 12 of FIG. 2 are identical so that the comparison signal, which is a function of the difference between the signals at inputs 30 and 31 and which are normally different during synchronization, goes to zero after closing of contactor 21. Thus, once contactor 21 is closed, the present invention controls the parallel-connected systems in accordance with the voltage signal for each phase of each generator, each voltage signal being proportional to the circulating component in that phase of the total parallel-connected system.

The top portion of FIG. 2 shows the synchronization circuit of the load division and sync circuit 12 used for initial synchronization of the two generators, G1 and G2. Applied to inputs 30 and 31 are the terminal voltages of phase A of generators 1 and 2, respectively, as these generators are operating independently of each other. These terminal voltage signals are fed through amplifiers 32 and 33 which convert these two signals into square waves in accordance with their zero crossings. These square wave signals are supplied, respectively, to flip-flops 34 and 35, which measure the phase difference between these two signals. When the square wave signal at the output of comparator 32 is leading the square wave signal at the output of comparator 33, the Q output of flip-flop 34 indicates this phase difference and is applied via a scaling resistor to the non-inverting input of an operational amplifier 36 connected as a differential amplifier. Conversely, when the square wave signal at the output of comparator 32 is lagging the square wave signal at the output of comparator 33, the Q output of flip-flop 35 indicates this phase difference and is applied via a scaling resistor to the inverting input of operational amplifier 36. The output signal from operational amplifier 36 goes negative when generator 1 phase A leads generator 2 phase A (which effectively causes the frequency of generator 1 to be decreased) and goes positive when generator 1 phase A lags generator 2 phase A (which effectively causes the frequency of generator 1 to be increased.

The signal at the output of amplifier 36, which is the voltage control signal on line 20 of FIG. 1, is the output of a phase discriminator of a phase lock loop made up of the voltage controlled oscillator of frequency control 13, the wave generator 15 and generator 1. This phase lock loop brings the frequency and phase of phase A of generator 1 into alignment with the frequency and phase of phase A of generator 2. Once this frequency and phase synchronization is achieved, contactor 21 is closed, connecting generators 1 and 2 in parallel. Once the generators are in parallel, the phase discriminator made up of comparators 32 and 33 and flip-flops 34 and 35 no longer provides a phase difference signal because the terminal voltage signals at the inputs of comparators 32 and 33 are the same signal. Thereafter, the load division circuit shown in the bottom part of FIG. 2 takes control of the frequency and phase of the generators by generating the control signal on line 20 proportional to a component of the circulating current, which effectively adjusts the frequency and phase of generator 1.

Referring now to the load division circuit of FIG. 2, a control transformer loop designated generally by reference numeral 40 includes a primary winding 43 of a transformer 41 and the secondaries of current sensing transformers 42 and 42a and the burden resistors 50 and 50a connected across secondaries 42 and 42a, respectively. Transformer 42 provides at its secondary winding a signal proportional to the current level of phase A of generator 1, and transformer 42a provides at its secondary windings a signal proportional to the current level of phase A of generator 2. The secondaries of transformers 42 and 42a are connected as shown in the load division circuit of FIG. 2 to produce a difference signal across burden resistor 50 proportional to the difference of currents of the two generator phases A. This difference signal is applied to the primary winding 43 of transformer 41, and a corresponding phase-inverted difference signal across burden resistor 50a is applied to the primary winding 43a of an identical transformer 41a for phase A of generator 2 (shown in dashed lines).

It should be understood at this point that only one load division circuit is shown in FIG. 2 because it is assumed that generator 1 is a symmetrical, three-phase system with phases B and C being displaced 120° and 240°, respectively; therefore, if phase A of the total system is effectively controlled, then phases B and C will be correspondingly controlled. However, if improved load division between the parallel-connected generators is desired, each phase of the total system can be measured and controlled using a similar load division circuit as that shown in FIG. 2.

The purpose of transmission gates 45 and 46 connected to the respective secondary 44 leads of transformer 41 is to provide the system with phase sensitivity. Transmission gates 45 and 46 essentially act as on-/off switches, which are controlled by a reference signal on a line 48 (shown as line 16 on FIG. 1) from the wave generator 15. The purpose of the transmission gates or discriminators 45 and 46 is to provide that portion of the circulating current phasor which is used to control the frequency of phase A of the total system.

In a normal generator system, when two generators are connected in parallel and the generated voltages are equal in amplitude but displaced in phase, i.e., a difference in frequency exists between the two, the phasor difference voltage of the two generated voltages is at 90° to the system terminal voltage. This phasor difference voltage applied to the inductive source impedance of the generators results in a circulating current in phase with the system terminal voltage. This circulating current signal is used by the present invention to control the speed of the generators and hence the frequency of the power produced thereby so as to reduce the circulating current to substantially zero.

In comparison, in a VSCF system, when two generators are connected in parallel and the generated voltages are equal in amplitude but displaced in phase, the phasor difference voltage of the two generated voltages is at 90° to the system terminal voltage. However, because the source impedance of the VSCF is only 45° lagging, the circulating current is displaced from the phasor difference voltage by 45° as opposed to 90° in the conventional generator system. This circulating current signal is thus displaced 45° from the system terminal voltage and is used by the present invention to control the frequency of the power generated by the cycloconverters so as to reduce the circulating current to substantially zero.

Referring again to FIG. 2, in the case of a VSCF system, the 45° leading signal on line 16 from wave generator 15 is brought in on line 48. If the proper desired 45° leading signal cannot be furnished by wave generator 15, it may be generated by introducing a 45° phase lead to the phase A voltage from generator 1. In the case of a conventional generator system, the signal applied to terminal 48 would be merely in phase with the system terminal voltage for phase A. The explanation given below for the load division circuit is for the VSCF application, but is equally applicable to the conventional generator application if the signal on line 48 is in phase with the system terminal voltage.

The control signal on line 48 is essentially a square wave, and is used to switch the transmission gates 45 and 46. The transmission gates 45 and 46 in conjunction with secondary winding 44 can be thought of as operating similar to a full-wave rectifier controlled by the control signal on line 16 from the wave generator 15.

It is through the selection of one phasor part of the total difference current signal of phase A that it is possible for the load division circuit effectively to adjust the frequency of the power generated by the cycloconverters. When two systems are connected in parallel (FIG. 1), the frequency correction caused by the load division circuit in one system is in a first direction and the frequency correction produced in the second system will be in the opposite direction. This frequency correction can be understood by assuming that the reference oscillators of the parallel-connected generator systems are different in frequency. If the reference oscillator 13a of generator 1 is lower in frequency than the reference oscillator 13a' of generator 2, then the circulating current will tend to drive generator 1 to a greater frequency, while at the same time tending to drive lower the frequency of generator 2. Inverter 47 merely acts to provide the inversion of the square wave signal on input 48 applied to transmission gate 46 to produce the full-wave phase discrimination action of the two transmission gates 45 and 46.

Once the desired phasor portion of the circulating current has been derived at the commonly connected outputs of transmission gates 45 and 46, it is applied to an inverting input of an amplifier 49, which acts as a buffer stage. The output of amplifier 49 is supplied to the inverting input of amplifier 36 discussed above. The output of amplifier 36 constitutes the frequency control voltage applied to frequency control 13 to readjust the frequency of the electric power generated by the cycloconverter of generator 1 phase A in accordance with the selected phasor portion of the circulating current.

The output of amplifier 36 is a DC signal having an amplitude proportional to the selected phasor portion.

FIG. 3 shows in block diagram form a preferred embodiment of the frequency control 13. This embodiment is equally applicable to frequency control 13'. Frequency control 13 includes a reference oscillator 60 and a voltage controlled oscillator 71. (Reference oscillator 60 is designated as block 13a in FIG. 1.) The signal supplied to a line 72 is the output signal from amplifier 36 of the load division and sync circuit 13, and this signal is applied to the inverting input of an amplifier 70.

Within frequency control 13 is a control loop consisting of phase shift 62, discriminators 62 and 63, filters 64 and 65, flip-flops 66 and 67, amplifier 70, voltage controlled oscillator 71, and a line 73. This control loop in cooperation with the load division and sync circuit 12 loop produces averaging of the frequencies of the reference oscillator 60 and the corresponding reference oscillator of the other system connected in parallel. If the frequency control 13 is used in connection with a speed control of a motor, then a signal is applied to line 72 which causes a readjustment of the frequency control loop of this speed control.

The determination of any frequency difference between the voltage control oscillator 71 and the reference oscillator 60 is straightforward. This determination involves the use of a discriminator, such as discriminator 63, wherein the output of voltage controlled oscillator 71 is phase discriminated against the output of reference oscillator 60. The output of discriminator 63 is a series of pulses, the filtered average of which is indicative of any difference in frequency. For example, reference oscillator 60 produces a high frequency output signal having a fixed frequency in the 3 megahertz range.

There must be additional circuitry beyond that necessary to determine the frequency difference in order to determine whether the frequency of the output of voltage controlled oscillator frequency 71 is less than or greater than the output of reference oscillator 60. The relationship of the frequency of the output from voltage controlled oscillator 71 to the frequency of the output from reference oscillator 60 is determined by the present invention through the use of two discriminators as follows. One of the oscillators, in the case the voltage controlled oscillator 71, is applied as an input to both discriminators 62 and 63, while the other oscillator, in this case reference oscillator 60, is applied directly as an input to discriminator 63 but is phase shifted by a preselected amount by phase shift 61 before being supplied as an input to discriminator 62. The use of the phase shifting allows the determination of the frequency relationship between the two frequency signals. That is to say, the phase of one of the discriminator output envelopes reverses with respect to the other discriminator output envelope when the frequency of the voltage controlled oscillator goes from being greater than to less than the frequency of the reference oscillator. It should be noted that the phase shift produced by phase shift 61 may be any amount, so long as it is not close to zero or 180°. A phase shift of 90° is easily obtainable with digital techniques, and is used in the preferred embodiments.

The outputs from discriminator 62 and the output from discriminator 63 are filtered and squared by filters 64 and 65, respectively. This filtering and squaring operation is necessary in order to obtain respective square wave signals indicative of both the frequency and the phase relationship of the envelope outputs of discriminators 62 and 63. That is to say, the cycle time of either of the square waves is indicative of the absolute frequency difference between the outputs of the two oscillators, and the phase relationship between the two square waves is indicative of the actual frequency relationship between the two oscillator outputs. This analysis of the square waves is performed by flip-flops 66 and 67.

Flip-flops 66 and 67 are used to compare the square wave signals at the outputs of filters 64 and 65 to establish the phase relationship between these two square wave signals. The flip-flop having the square wave from one of the filters applied to its data (D) input which goes positive prior to the other square wave applied to its clock (CL) input is toggled and indicates that the square wave at its data input is leading the square wave at its clock input. The other flip-flop, however, is cross-connected and does not toggle because its data input is low when the square wave applied to its clock input goes high. Thus, the outputs of flip-flops 66 and 67 indicate the actual frequency relationship between the two oscillator outputs.

The output of the toggled flip-flop is applied either to the non-inverting or inverting terminal of amplifier 70, whose output drives voltage controlled oscillator 71 up or down in frequency depending on which of flip-flops 66 or 67 is toggled. For example, the output of flip-flop 66 is connected to the non-inverting input of amplifier 70, and the output of flip-flop 67 is connected to the inverting input of amplifier 70. When flip-flop 66 is toggled, the output of amplifier 70 goes positive, which indicates that the frequency of the reference oscillator 60 is greater than the frequency of the voltage controlled oscillator 71. The toggling of flip-flop 67 indicates the opposite condition.

As stated above, the toggling of either flip-flop 66 or 67 indicates only the direction of the frequency error and does not indicate the frequency difference, which must be known. Either of the flip-flops 66 or 67 is toggled for each cycle of the frequency difference. The outputs of flip-flops 66 and 67 are provided as inputs to an OR gate 68, whose output goes high for each toggle. This output signal is applied to the reset (R) input of a counter 69, and allows counter 69 to count when this output signal is high. Counter 69 also has applied to its clock (CL) input the output signal from the reference oscillator 60. Therefore, counter 69 will count a given number of reference oscillator cycles before the count is terminated by the output Q of counter 69 going high, which resets flip-flop 66 or 67.

The average voltage at the Q outputs of either of the flip-flops 66 or 67 is indicative of the frequency difference and is equal to the flip-flop high voltage times the ratio of the measured time divided by the period of the difference frequency. The gain of the frequency difference detector can be made as high as is desired by increasing the number of counts of counter 69. For example, if it is desired to control the output frequency to plus or minus 10% of the reference oscillator frequency, the following approach may be used. Counter 69 is set to count eight frequency reference periods. When the high state of the flip-flops is 12 volts, a 10% frequency error will be indicated by a 9.6-volt signal to the input of amplifier 70, which is eight divided by ten times twelve.

Reference oscillator 60 is set to a high frequency value, for example, 3 megahertz. By running reference ocillator 60 at a much higher frequency than the generator output, the response of the frequency control loop is rapid. The frequency control will introduce negligible phase shift in the load division loop when, for example, the frequency of the generator output is 400 Hz.

Referring now to FIG. 4, there is shown a detailed circuit of the first embodiment of frequency control 13 of the present invention. In this embodiment, the frequency of the output on line 74 from the voltage controlled oscillator is 3.06 megahertz when there is no control signal on line 72. The embodiment of FIG. 4 is constructed using CMOS components. CMOS components have been found to be advantageous in VSCF aicraft applications because of their low power consumption and high noise immunity.

The reference oscillator consists of a 6.25 megahertz crystal 80, capacitors 81 and 82, resistors 83 and 84, and an inverter 85. The output of the oscillator appears on line 86 and is applied to the clock (CL) terminal of a flip-flop 87. Flip-flop 87 produces at its Q output the logic state of its data (D) input when a clock input is received. Flip-flop 87 is a divide by two counter in that its D input is connected to its $\bar{Q}$ output. The Q and $\bar{Q}$ outputs of flip-flop 87 are consequently at 3.06 megahertz. Line 88 is connected to the $\bar{Q}$ output of flip-flop 87, and line 90 is connected to the Q output.

FIG. 6A plots the waveforms present at various points in the frequency control circuit 13 of FIG. 4, with the vertical axis of each trace representing amplitude and with the horizontal axis of each trace representing time. The horizontal axis of each trace is consistent.

A flip-flop 92 is connected as a divide by two counter and produces at its Q output connected to a line 89 a signal whose frequency is one-half of the frequency of the signal applied to its clock input from flip-flop 87. The waveform of the output signal on line 89 is shown on FIG. 6A, and is a 1.53 megahertz square wave. This signal is applied to the D terminal of a flip-flop 93 and to an input of an exclusive OR gate 94. Exclusive OR gate 94 produces the same function as discriminator 63 of FIG. 3.

The 90° phase shift necessary for determining whether the voltage controlled oscillator is faster or slower than the reference oscillator is produced by flip-flop 93. Line 90 is connected to its clock input. Flip-flop 93 produces at its Q output terminal a square wave signal that is lagging by 90° the signal on line 89. The output signal on the Q terminal is applied via a line 91 to an input of an exclusive OR gate 95. The waveform on line 91 is shown in FIG. 6A. Exclusive OR gate 95 produces the same function as discriminator 62 of FIG. 3.

Both exclusive OR gates 94 and 95 have applied to their other inputs a signal on a line 97 representative of the voltage controlled oscillator output. The frequency of the voltage controlled oscillator is 3.06 megahertz. A flip-flop 96 is connected as a divide by two counter and has its clock input connected to the output of the voltage controlled oscillator via a line 131. Hence, the frequency of the signal at the $\bar{Q}$ of flip-flop 96 is at 1.53 megahertz, and is applied via line 97 to exclusive OR gates 94 and 95.

For purposes of illustration, the signal on line 97 is first assumed to be slightly lagging the signal on line 89, the reference oscillator signal, as shown in FIG. 6A. When this lag occurs, a series of relatively wide pulses appear on line 98, as labeled in FIG. 6A as line 98 lag. Similar traces are shown for the state where the signal on line 97 is leading the signal on line 89. The pulses from discriminators 95 and 94 are of widths determined by the phase relationship between the voltage controlled oscillator signal 97 and the reference oscillator signals 91 and 89, respectively.

Figure 6B:
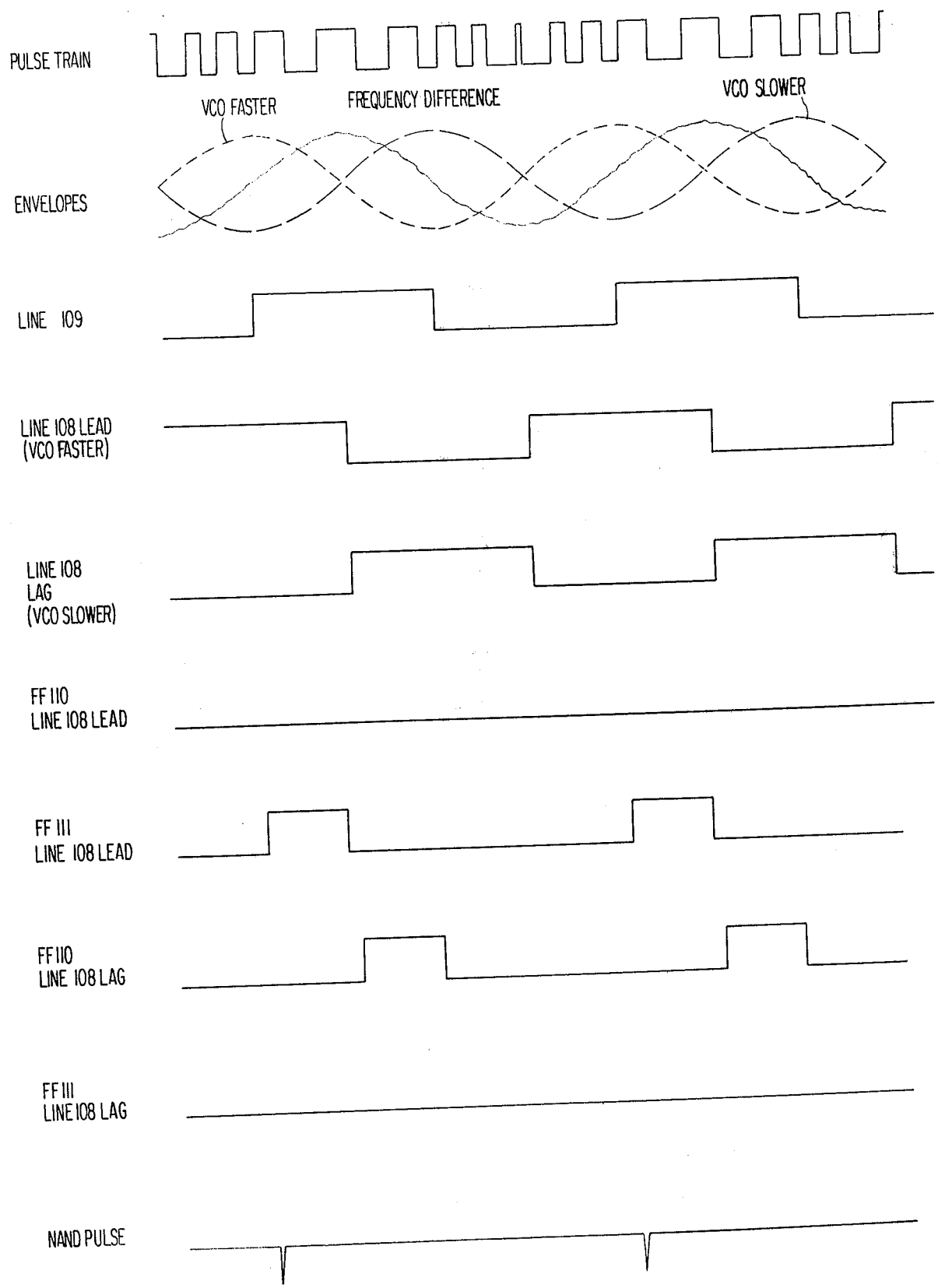

The pulse train shown in FIG. 6B is representative of the outputs of discriminators 95 and 94 and shows the condition where the frequency difference is large, as shown by the fact that there are only a few pulses per cycle of frequency difference. FIG. 6B plots the envelopes of the pulse trains that appear on lines 98 and 99 during such a condition. The curve marked "frequency difference" represents the output that appears on line 99 since it is merely the voltage controlled oscillator output discriminated against the reference oscillator output. The curve labeled "VCO faster" is the envelope of the pulses that appear on line 98 when the frequency of the VCO signal is higher than the frequency of the reference oscillator. Similarly, the curve marked "VCO slower" is the envelope of the pulses that appear on line 98 when the frequency of the VCO is lower than the frequency of the reference oscillator. A comparison of the signals on lines 98 and 99 determining whether the frequency of the VCO is higher or lower than the frequency of the reference oscillator.

The transformation of the pulse trains at discriminator outputs 98 and 99 to corresponding square waves is accomplished by a filtering and Schmitt triggering operation, as shown in FIG. 4. The filter, Schmitt trigger circuit which shapes the output signals on line 98 includes a resistor 101, a resistor 102, a capacitor 100, and an amplifier 103. Similarly, the output on line 99 is transformed to a corresponding square wave by the circuit comprising a resistor 105, a resistor 106, a capacitor 104, and an amplifier 107.

The waveform of the signal on line 109 is plotted in FIG. 6B. The signal on line 109 represents the absolute frequency difference. The operation of flip-flops 110 and 111, which correspond respectively to flip-flops 66 and 67 of the embodiment of FIG. 3, is understood best if it is assumed that the signal on line 108 is leading the signal on line 109, as is shown in FIG. 6B. When this condition is present, the frequency of the VCO is higher than the frequency of the reference oscillator.

Referring again to FIG. 4, when the signal on line 108 leads the signal on line 109, flip-flop 110 always remain low because its clock (line 108) goes high prior to when its data input (line 109) goes high. Conversely, flip-flop 111 will trigger once each cycle, and will trigger on the leading edge of the pulses on line 109 because its data input (line 108) is high at that time.

The outputs of flip-flops 110 and 111 when the signal on line 108 is leading the signal on line 109 are plotted in FIG. 6B. Similarly, the outputs of flip-flops 110 and 111 when the signal on line 108 lags the signal on line 109 are also plotted in FIG. 6B.

Connected to $\bar{Q}$ output of flip-flop 110 and Q output of flip-flop 111 are the two inputs of an exclusive OR gate 112. Exclusive OR gate 112 is functionally equivalent to OR gate 68 of FIG. 3. The output of exclusive OR gate 112 is high when either but not both the Q output of flip-flop 111 is high or the $\bar{Q}$ output of flip-flop 110 is high. The output of exclusive OR gate 112 is connected to the reset terminal of a counter 113. The clock input of counter 113 is connected by a lead 90 to the output signal from the reference oscillator. The output Q of counter 113 is fed back to the reset inputs of flip-flops 110 and 111. The number of counts of counter 113 specifies the periods that flip-flops 110 or 111 remains in the Q high state. The Q output of flip-flop 110 is supplied via a line 114 to one of the inputs of an amplifier 116, and the Q output of flip-flop 111 is furnished via line 115 to the other input of amplifier 116.

Also applied to the inverting input of amplifier 116 connected to line 114 is the control voltage signal supplied via line 72 from the load division and sync control circuit 12 of FIG. 2. A capacitor 121 connected between the output and the inverting input of amplifier 116 and a capacitor 120 connected between the non-inverting input and ground cause amplifier 116 to provide at its output a signal which is an integral of the pulse train signals being provided at its inputs. This output signal from amplifier 116 is used to drive the voltage controlled oscillator.

The voltage controlled oscillator comprises NAND gates 124 and 125 and buffer amplifiers 126, 127 and 128. The output of the voltage controlled oscillator appearing on line 74 has a center frequency of 3.06 megahertz when there is no signal on line 72, and this output signal is fed to the wave generator 15 of FIG. 1 for frequency control of the system.

In FIG. 5, another embodiment of the frequency control of the present invention is shown. The reference oscillator includes a multi-stage counter 150 which divides the frequency of the basic oscillator and provides at its Q2 and Q3 outputs frequency signals to the inputs of an exclusive OR gate 151. Exclusive OR gate 151 produces the phase shift required for determining whether the frequency of the voltage controlled oscillator is higher or lower than the reference oscillator frequency. Thus, exclusive OR gate 151 produces the same function as flip-flop 93 of FIG. 4. The inputs of an exclusive OR gate 152 are connected to the output of exclusive OR gate 151 and the output of the voltage controlled oscillator 180 on line 74. Exclusive OR gate 152 performs the same function as exclusive OR gate 95 of FIG. 4. The inputs of an exclusive OR gate 153 are connected to the Q3 output of counter 150 and the output of voltage controlled oscillator 180 and it performs the same function as exclusive OR gate 94 of FIG. 4.

The filtering and squaring function is performed in the embodiment of FIG. 5 by resistors 154 and 155, capacitors 156 and 157, and NAND gate 158. NAND 158 includes an internal Schmitt trigger. These components produce the same function as buffer amplifier 103 and its associated components in FIG. 4.

Resistors 159 and 160, capacitors 161 and 162 and NAND gate 163 perform the same filtering and squaring function for the output signal of exclusive OR gate 153. These components thus produce the same function as do buffer amplifier 107 and its associated components in FIG. 4.

Flip-flops 164 and 165 perform the same functions respectively as produced by flip-flops 110 and 111 of FIG. 4. An exclusive OR gate 166 produces the inverse function as produced by exclusive OR gate 112 of FIG. 4, but because of the inversion produced by NAND gate 168, the output of NAND gate 168 is analogous to the output produced by exclusive OR gate 112.

The embodiment of FIG. 5 also includes additional circuitry used to eliminate any ambiguity which occurs when the period of the count time of the counter exceeds the period of the frequency difference between the reference oscillator output and the output of the voltage controlled oscillator. If the count time of the embodiment of FIG. 4 exceeds the frequency difference time, counter 113 will continue to count into the next cycle. This interval overlap produces an ambiguity. As can be seen from the trace labeled flip-flop 111 (line 108 lead) of FIG. 6B, if the period of counter 113 extends into the period of the next count, the flip-flop 111 will not return to its reset state until after its clock pulse is received. When flip-flop 111 returns to its reset state, it will go low and remain so until the next clock signal is received. Thus, when the period of the counter 113 exceeds the frequency difference, the output of flip-flop 111 will go low rather than remain at the proper high level. The same ambiguity problem exists with respect to flip-flop 110. In order to correct this ambiguity problem in the embodiment of FIG. 4, additional circuitry has been added to the embodiment of FIG. 5.

NAND gates 167 and 168 and a capacitor 169 and a resistor 170 are the additional circuitry added to the embodiment of FIG. 5 to prevent the ambiguity condition. This circuit produces a negative-going transient at the input of NAND gate 168 whenever the output of both NAND gates 158 and 163 goes high. NAND gate 168 inverts the negative-going transient at its input. In this way, a positive transient is always applied to the reset input of counter 171 to restart its counting cycle. Thus, when the frequency error is great, and the time period of counter 171 exceeds the time period of the frequency difference, the Q outputs of flip-flops 164 or 165 applied to the voltage control oscillator via amplifier 172 will remain at their high state rather than being reset to the low state for part of every other frequency difference cycle.

In the embodiment of FIG. 5, amplifier 172 and its associated components perform the same function that is produced by amplifier 116 and its associated components of FIG. 4.

The voltage controlled oscillator of the embodiment of FIG. 5 is indicated by reference numeral 180.

It should be noted that the embodiments for implementing the apparatus and method of the present invention are only illustrative, and other embodiments which produce the same function are included within the scope of this specification.

The apparatus of the present invention can be fabricated in discreet component form, or it can be fabricated using any type of presently available integrated circuit technique including hybrid integrated circuit technology. The apparatus and method of the present invention are applicable for any VSCF power generation system of any phase, voltage level and preselected frequency, and for any conventional power generator or alternating current motor drive system.

What is claimed is:

1. Apparatus for frequency adjusting an alternating current machine comprising:
   (a) a reference oscillator having an output;
   (b) a signal controlled oscillator for producing a controlled output frequency signal, having an input and an output effectively connected to said alternating current machine;
   (c) first means for producing a signal proportional to the frequency difference between said reference oscillator output and said controlled output frequency;
   (d) second means for providing a signal indicative of whether said controlled output frequency is above or below the frequency of said reference oscillator output; and (e) means for supplying a drive signal to said input of said signal controlled oscillator in response to said signal of said first means and said signal of said second means.

2. The apparatus of claim 1, wherein said first means comprises:
(a) first discriminator means for furnishing an output signal proportional to the phase difference between said reference oscillator output and said controlled output frequency signal; and
(b) first filter means producing a filtered version of said output signal of said first discriminator means.

3. The apparatus of claim 2, wherein said second means comprises:
(a) phase shift means for introducing a desired phase shift to said reference oscillator output;
(b) second discriminator means for supplying an output signal inputs connected proportional to the phase difference between said phase-shifted reference oscillator output and said controlled output frequency signal;
(c) second filter means providing a filtered version of said output signal of said second discriminator means; and
(d) means for generating an output signal indicating the phase relationship between said output signal of said first filter means and said output signal of said second filter means.

4. The apparatus of claim 3, wherein said means for generating an output signal indicating the phase relationship comprises:
(a) a first flip-flop having a clock input effectively connected to said output signal of said first filter means, a data input effectively connected to said output of said second filter means, and an output; and
(b) a second flip-flop having a clock input effectively connected to said output of said second filter means, a data input effectively connected to said output of said first filter means, and an output.

5. The apparatus of claim 4, wherein said means for supplying a drive signal comprises:
(a) an amplifier having inputs effectively connected to said outputs of said first and second flip-flops, and an output effectively connected to said input of said signal controlled oscillator;
(b) third logic means having inputs effectively connected to said outputs of said first and second flip-flops, and an output; and
(c) counter means having a reset input effectively connected to said output of said third logic means, a clock input effectively connected to said reference oscillator output, and an output effectively connected to set or reset inputs of said flip-flops.

6. An apparatus for producing a controlled frequency output, comprising:
(a) a reference oscillator having an output;
(b) phase shift means for introducing a desired phase shift to said reference oscillator output;
(c) first discriminator means for providing an output signal proportional to the phase difference between said output of said phase shift means and a signal present at an input;
(d) second discriminator means for producing an output signal proportional to the phase difference between said reference oscillator output and a signal present at an input;
(e) first filter means for furnishing a filtered version of said output of said first discriminator means;
(f) second filter means for supplying a filtered version of said output of said second discriminator means;
(g) first logic means having a clock input effectively connected to said output of said second filter means and an input effectively connected to said output of said first filter means;
(h) second logic means having a clock input effectively connected to said output of said first filter means and an input effectively connected to said output of said second filter means;
(i) third logic means having a first input effectively connected to said output of said first logic means, a second input effectively connected to said output of said second logic means, and an output;
(j) counter means having a reset input effectively connected to said output of said third logic means, a clock input effectively connected to said reference oscillator output, and an output effectively connected to set or reset inputs of said first and second logic means;
(k) amplifier means having a first input effectively connected to said output of said first logic means, a second input effectively connected to said output of said second means, and an output,
(l) control signal input means effectively connected to one of said inputs of said amplifier means; and
(m) a controlled oscillator having an input effectively connected to said output of said amplifier means and having an output effectively connected to said inputs of said first discriminator means and second discriminator means, said output providing a controlled frequency signal.

7. The apparatus of claims 5 or 6, further comprising:
(a) fourth logic means providing an output signal in a low state in response to said outputs of said first and second filter means in a high state;
(b) differentiator means for generating a derivative signal of said output of said fourth logic means; and
(c) fifth logic means for providing a signal to said reset input of said counter means in response to said output of said third logic means and said derivative signal.

8. A method of connecting and controlling alternating current systems having individual frequency controls with independent reference oscillators, comprising the steps of:
(a) connecting said alternating current systems for paralleled operation;
(b) measuring the circulating current between said parallel-connected alternating current systems;
(c) producing a first control signal proportional to a component of said circulating current;
(d) Adjusting the individual frequency controls of each said alternating current system in accordance with said first control signal, including
applying said control signal to a signal controlled oscillator; and
simultaneously applying a second signal to said signal controlled oscillator having a magnitude proportional to the frequency difference between the output of said signal controlled oscillator and the output of one of said reference oscillators, and having a polarity indicative of the frequency relationship between said output of said signal controlled oscillator and said output of said one of said reference oscillators; and (e) approximately synchronizing the frequency and phase of said alternating current systems prior to connecting said systems together in accordance with step (a).

9. The method of claim 8, wherein the step of applying a second signal comprises the steps of:
 (a) phase shifting said reference oscillator output;
 (b) discriminating said phase shifted reference oscillator output and said output of said signal controlled oscillator;
 (c) discriminating said reference oscillator output and said output of said signal controlled oscillator output to determine the frequency difference between said reference oscillator output and said output of said signal controlled oscillator;
 (d) filtering outputs from steps (b) and (c);
 (e) comparing said outputs from step (d) to establish which output of step (d) is leading; and
 (f) applying a signal to said signal controlled oscillator in accordance with the output of steps (e) and (c).

* * * * *